(12) United States Patent
Hoefel et al.

(10) Patent No.: US 9,129,135 B2
(45) Date of Patent: Sep. 8, 2015

(54) PLAY TIME DISPENSER FOR ELECTRONIC APPLICATIONS

(75) Inventors: Guilherme Luiz Karnas Hoefel, San Diego, CA (US); Hugo Swart, San Diego, CA (US); Khaled Helmi El-Maleh, San Marcos, CA (US); Luis Mirabal, San Diego, CA (US)

(73) Assignee: Jeffrey D. Jacobs, San Diego, CA (US)

( * ) Notice: Subject to any disclaimer, the term of this patent is extended or adjusted under 35 U.S.C. 154(b) by 0 days.

(21) Appl. No.: 13/210,529

(22) Filed: Aug. 16, 2011

(65) Prior Publication Data
US 2013/0047229 A1 Feb. 21, 2013

(51) Int. Cl.
| | |
|---|---|
| G06F 7/04 | (2006.01) |
| G06F 17/30 | (2006.01) |
| H04N 7/16 | (2011.01) |
| G06F 21/00 | (2013.01) |
| G06F 21/62 | (2013.01) |
| G06F 21/12 | (2013.01) |

(52) U.S. Cl.
CPC ............ G06F 21/629 (2013.01); G06F 21/121 (2013.01); G06F 21/62 (2013.01); G06F 2221/2113 (2013.01)

(58) Field of Classification Search
CPC ......... G06F 21/10; G06F 21/12; G06F 21/62; G06F 21/6218; G06F 2221/2141; G06Q 10/06
USPC .................. 726/2–7, 17–21, 26–29
See application file for complete search history.

(56) References Cited

U.S. PATENT DOCUMENTS

| | | | |
|---|---|---|---|
| 5,907,831 A * | 5/1999 | Lotvin et al. ............... | 705/14.27 |
| 6,678,824 B1 * | 1/2004 | Cannon et al. ................... | 726/22 |
| 7,747,680 B2 | 6/2010 | Ravikumar et al. | |
| 8,010,037 B2 * | 8/2011 | Bannwolf et al. ............ | 434/350 |
| 2002/0116266 A1 * | 8/2002 | Marshall ......................... | 705/14 |
| 2004/0030599 A1 | 2/2004 | Sie et al. | |
| 2004/0064415 A1 * | 4/2004 | Abdallah et al. ................ | 705/50 |
| 2004/0073488 A1 * | 4/2004 | Etuk et al. ....................... | 705/14 |
| 2005/0114452 A1 | 5/2005 | Prakash | |

(Continued)

FOREIGN PATENT DOCUMENTS

| | | |
|---|---|---|
| JP | 2001175348 A | 6/2001 |
| JP | 2001218976 A | 8/2001 |

(Continued)

OTHER PUBLICATIONS http://www.getcomet.com/aboutcomt.htm, "COMMET", 2010.

(Continued)

*Primary Examiner* — Tae Kim
(74) *Attorney, Agent, or Firm* — Jeffrey D. Jacobs

(57) ABSTRACT

Systems, methods, devices, and computer program products are described for controlling access to electronic applications by a user. A request may be received (e.g., from a user) to access an electronic application. The availability of points, credits, or time for the particular user may be determined, and access to the electronic application granted or denied based on the determination. User identity may be verified through biometric data, with such verification repeated at periodic or random intervals. Access may be restricted based on a permission level of a particular authority that has responsibility for all or a portion of the user's activities during a particular time period. Access may also be restricted based on the location of the user at the time of the access request.

43 Claims, 10 Drawing Sheets

(56) References Cited

U.S. PATENT DOCUMENTS

| | | | |
|---|---|---|---|
| 2005/0166060 A1* | 7/2005 | Goldthwait et al. | 713/182 |
| 2005/0183143 A1* | 8/2005 | Anderholm et al. | 726/22 |
| 2005/0240959 A1* | 10/2005 | Kuhn et al. | 725/25 |
| 2006/0242309 A1 | 10/2006 | Damick et al. | |
| 2006/0285017 A1 | 12/2006 | Ellis et al. | |
| 2007/0060355 A1* | 3/2007 | Amaitis et al. | 463/40 |
| 2008/0016211 A1 | 1/2008 | Hillary et al. | |
| 2008/0320010 A1 | 12/2008 | Li et al. | |
| 2009/0038005 A1* | 2/2009 | Howarth | 726/21 |
| 2009/0063247 A1 | 3/2009 | Burgess et al. | |
| 2009/0064302 A1* | 3/2009 | Colella | 726/9 |
| 2009/0113519 A1 | 4/2009 | Evans et al. | |
| 2009/0254656 A1 | 10/2009 | Vignisson et al. | |
| 2009/0282438 A1 | 11/2009 | White | |
| 2009/0313677 A1* | 12/2009 | Vidya et al. | 726/2 |
| 2010/0116884 A1* | 5/2010 | Alderucci et al. | 235/382 |
| 2010/0198825 A1 | 8/2010 | Chan et al. | |
| 2010/0285871 A1* | 11/2010 | Shah et al. | 463/29 |
| 2011/0236872 A1* | 9/2011 | Taylor | 434/350 |
| 2012/0122566 A1* | 5/2012 | Bhogal et al. | 463/29 |
| 2012/0130860 A1 | 5/2012 | Suzuki et al. | |
| 2013/0047260 A1 | 2/2013 | Hoefel et al. | |

FOREIGN PATENT DOCUMENTS

| | | |
|---|---|---|
| JP | 2008503113 A | 1/2008 |
| JP | 2011008817 A | 1/2011 |
| WO | 2005109883 A2 | 11/2005 |
| WO | 2006091684 A2 | 8/2006 |

OTHER PUBLICATIONS

International Search Report and Written Opinion—PCT/US2012/051199—ISA/EPO—Nov. 26, 2012.

* cited by examiner

PLAY TIME DISPENSER FOR ELECTRONIC APPLICATIONS

CROSS REFERENCES

This application is related to the following co-pending U.S. patent application Ser. No. 12/210,544, entitled "COLLABORATIVE CONTENT RATING FOR ACCESS CONTROL", filed concurrently herewith, assigned to the assignee hereof, and expressly incorporated by reference herein for all purposes.

BACKGROUND

The following relates generally to electronic application access restrictions, and more specifically to electronic monitoring of such access with restrictions places on times or amount of access.

Children and young adults are presented with numerous electronic entertainment options ranging from video games to electronic social networks to the Internet. Such a wide variety of electronic entertainment options, and the widespread and nearly ubiquitous availability of access to such entertainment, generates concern about the amount of time spent in these activities. For example, many parents are concerned about the amount of time their child may spend playing video games or accessing the internet.

Further adding to many concerns is the difficulty for parents, or other care providers, to measure the time spent in these activities. Likewise, it is often difficult for users of electronic entertainment, such as children, to manage leisure time themselves. Up to this point, parents and children, for example, often have only informal ways of managing their time. When parents tell their children that they have time limitations for playing a video game, it is difficult to control the real outcome. In addition, it is difficult for parents and children to really monitor how much time is actually spent in each activity.

SUMMARY

The described features generally relate to one or more improved systems, methods, and/or apparatuses for granting access to electronic applications. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

An exemplary method for control of electronic applications includes: receiving data identifying a usage rate or amount for dispensing virtual credits for electronic application usage to a user; receiving a request from the user to initiate an electronic application; verifying a sufficient quantity of virtual credits are present to initiate the electronic application according to the received data; receiving biometric data from the user; comparing the received biometric data with previously stored biometric data for the user to verify the identity of the user; providing the user access to the electronic application when the user has a sufficient quantity of virtual credits and the user identity is verified; and locking the user from access to the electronic application when the virtual credits are below a threshold level or the user identity is not verified.

Embodiments of such a method may include identifying two or more levels of electronic application access authority, each level of access authority having a usage rate or amount for dispensing virtual credits for electronic application usage to a user; wherein the verifying a sufficient quantity of virtual credits comprises verifying a sufficient amount of virtual credits are present to initiate the electronic application according to the identified authority and virtual credits available to the user. Identifying two or more levels of electronic application access authority comprises, in an embodiment, identifying a first level of access authority and a second level of access authority, the first level of access authority having authority to define the level of access that may be granted by the second level of access authority. The first level of access authority may correspond to a parental access authority, and the second level of access authority may correspond to a caregiver access authority.

Also or alternatively, embodiments of the method may include one or more of the following features: receiving data identifying the electronic application as accretive or reductive of virtual credits and a rate or amount of accrual or reduction associated with the electronic application; adjusting the quantity of virtual credits available to the user based on (i) the amount of time during which the user accesses the electronic application, and (ii) the rate or amount of accrual or reduction associated with the electronic application; adjusting the quantity of virtual credits available to the user based on the amount of time during which the user accesses the electronic application and transmitting to a remote system an amount of the adjustment of virtual credits.

Also or alternatively, embodiments of the method may include one or more of the following features: the receiving biometric data comprises receiving biometric information from a mobile device associated with the user; the biometric data comprises one or more of an image of the user's face, a user voice sample, and an image of the user's fingerprint; repeating receiving of biometric data according to fixed periodic time intervals; repeating receiving of biometric data according to variable time intervals; and transmitting an electronic application access verification to a remote system in proximity to the user, where the remote system may be a gaming console.

Embodiments of such a method may also include receiving a base rate or amount for dispensing virtual credits and an adjustment to the base rate or amount to be applied based on predetermined conditions. Such an adjustment to the base rate or amount may be set according to parental specifications. Such an adjustment to the base rate or amount may vary, for example, as a function of one or more of (i) time of day and (ii) day of the week.

An exemplary system for providing user access to an electronic application comprises: means for receiving data identifying a usage rate or amount for dispensing virtual credits for electronic application usage to a user; means for receiving a request from the user to initiate an electronic application; means for verifying a sufficient quantity of virtual credits are present to initiate the electronic application according to the received data; means for receiving biometric data from the user; means for comparing the received biometric data with previously stored biometric data for the user to verify the identity of the user; means for providing the user access to the electronic application when the user has a sufficient quantity of virtual credits and the user identity is verified; and means for locking the user from access to the electronic application when the virtual credits are below a threshold level or the user identity is not verified.

Embodiments of such an apparatus may include one or more of the following features: means for adjusting the quantity of virtual credits available to the user based on the amount of time during which the user accesses the electronic application; means for receiving data identifying the electronic application as accretive or reductive of virtual credits and a rate or amount of accrual or reduction associated with the electronic application; means for adjusting the quantity of virtual credits available to the user based on (i) the amount of time during which the user accesses the electronic application, and (ii) the rate or amount of accrual or reduction associated with the electronic application; and means for receiving a base rate or amount for dispensing virtual credits and an adjustment to the base rate or amount to be applied based on predetermined conditions.

Also or alternatively, embodiments of the system may include one or more of the following features: the means for receiving biometric data comprises means for receiving one or more of an image of the user's face, a user voice sample, and an image of the user's fingerprint; and means for repeating receiving biometric data according to fixed periodic time intervals.

An exemplary apparatus for providing user access to an electronic application comprises: (A) a network interface module configured to: (i) receive a request for access to an electronic application by a user; and (ii) receive biometric information associated with the user; (B) a user profile database comprising: (i) user biometric information; and (ii) user virtual credit information; (C) an authentication module configured to receive the access request and biometric information, communicatively coupled with the network interface and user profile database, and configured to verify the received biometric information corresponds to user biometric information from the user profile database; and (D) an access module communicatively coupled with the network interface, the authentication module, and user profile database, and configured to (i) receive the access request, (ii) verify a sufficient quantity of virtual credits are present for the user in the user profile database to initiate the electronic application, (iii) receive a comparison of biometric data from the authentication module, and (iv) provide or deny the user access to the electronic application according to the verification and comparison.

In one embodiment of such an apparatus, the user profile database further comprises information for two or more levels of electronic application access authority for the user, each level of access authority having a rate or amount for dispensing virtual credits for electronic application usage to the user; and wherein the access module is further configured to verify a sufficient amount of virtual credits are present to initiate the electronic application according to the identified authority and virtual credits available to the user. Another embodiment of such an apparatus provides the two or more levels of electronic application access authority comprise a first level of access authority and a second level of access authority, the first level of access authority having authority to define the level of access that may be granted by the second level of access authority. The access module may be further configured to adjust the quantity of virtual credits available to the user based on the amount of time during which the user accesses the electronic application.

Also or alternatively, embodiments of the apparatus may include one or more of the following features: the user profile database further comprises information related to two or more electronic applications, data identifying each electronic application as accretive or reductive of virtual credits, and a rate or amount of accrual or reduction associated with the electronic application, and wherein the access module is further configured to adjust the quantity of virtual credits available to the user based on the amount of time during which the user accesses the particular electronic application and the rate or amount of accrual or reduction associated with the electronic application.

Embodiments of such an apparatus may include one or more of the following features: the biometric data comprises one or more of an image of the user's face, a user voice sample, and an image of the user's fingerprint; and the access module may be configured to repeat, according to fixed periodic time intervals, authentication and verification of a sufficient quantity of virtual credits when the user is provided access to the electronic application.

An exemplary mobile device for providing user access to an electronic application comprises: a receiver module configured to receive data identifying a usage rate or amount for dispensing virtual credits for electronic application usage to a user; an access request module configured to receive a request from the user to initiate an electronic application; an access verification module communicatively coupled to the access request module and receiver module, and configured to (i) verify a sufficient quantity of virtual credits are present to initiate the electronic application according to the received data, and (ii) receive a comparison of biometric data to verify the identify of the user; and an access grant module communicatively coupled to the access verification module and configured to provide or deny the user access to the electronic application according to information from the access verification module.

Embodiments of such an apparatus may include one or more of the following features: the access verification module may be further configured to repeat the verification and receipt of comparison of biometric data while the user is provided access to the electronic application; a biometric data module communicatively coupled to the access verification module and configured to receive biometric data associated with the user and compare the received biometric data with previously stored biometric data for the user to verify the identity of the user; and a biometric information collection module communicatively coupled to the biometric data module and configured to acquire one or more of an image of the user's face, an image of the user's fingerprint, and a sample of the user's voice.

An exemplary computer program product for providing user access to an electronic application includes computer-readable medium comprising: code for receiving data identifying a usage rate or amount for dispensing virtual credits for electronic application usage to a user; code for receiving a request from the user to initiate an electronic application; code for verifying a sufficient quantity of virtual credits are present to initiate the electronic application according to the received data; code for receiving biometric data from the user; code for comparing the received biometric data with previously stored biometric data for the user to verify the identity of the user; code for providing the user access to the electronic application when the user has a sufficient quantity of virtual credits and the user identity is verified; and code for locking the user from access to the electronic application when the virtual credits are below a threshold level or the user identity is not verified.

Embodiments of such a computer program product may include one or more of the following features: code for adjusting the quantity of virtual credits available to the user based on the amount of time during which the user accesses the electronic application; code for receiving data identifying the electronic application as accretive or reductive of virtual credits and a rate or amount of accrual or reduction associated with the electronic application; code for adjusting the quantity of virtual credits available to the user based on (i) the amount of time during which the user accesses the electronic application, and (ii) the rate or amount of accrual or reduction associated with the electronic application; and code for receiving a base rate or amount for dispensing virtual credits and an adjustment to the base rate or amount to be applied based on predetermined conditions.

An alternative exemplary method for administering user access to an electronic application comprises: identifying two or more levels of electronic application access authority, each level of access authority having a rate or amount for dispensing virtual credits for electronic application usage to a user; providing two or more different authorities with a different level of access authority; identifying one of the authorities as having current electronic application access authority for the user; receiving a request from the user to initiate an electronic application; verifying a sufficient quantity of virtual credits are present to initiate the electronic application according to the identified authority and virtual credits available to the user; providing the user access to the electronic application when the user has a sufficient quantity of virtual credits for the identified authority; and locking the user from access to the electronic application when the virtual credits are below a threshold level.

Embodiments of such a method may include one or more of the following features: identifying a first level of access authority and a second level of access authority, the first level of access authority having authority to define the level of access that may be granted by the second level of access authority, where, for example, the first level of access authority corresponds to a parental access authority and the second level of access authority corresponds to a caregiver access authority; and the first level of access authority may have authority to set time periods during which the user is locked from access to the electronic application regardless of the quantity of virtual credits available to the user.

Also or alternatively, the method may include determining a current location of the user; and locking the user from access to the electronic application when the user is within preset location boundaries. Such preset location boundaries may correspond to the location of a school

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Systems, methods, devices, and computer program products are described for controlling access to electronic applications by a user. A request may be received (e.g., from a user) to access an electronic application. The availability of points, credits, or time for the particular user may be determined, and access to the electronic application granted or denied based on the determination. User identity may be verified through biometric data, with such verification repeated at periodic or random intervals. Access may be restricted based on a permission level of a particular authority that has responsibility for all or a portion of the user's activities during a particular time period. Access may also be restricted based on the location of the user at the time of the access request.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
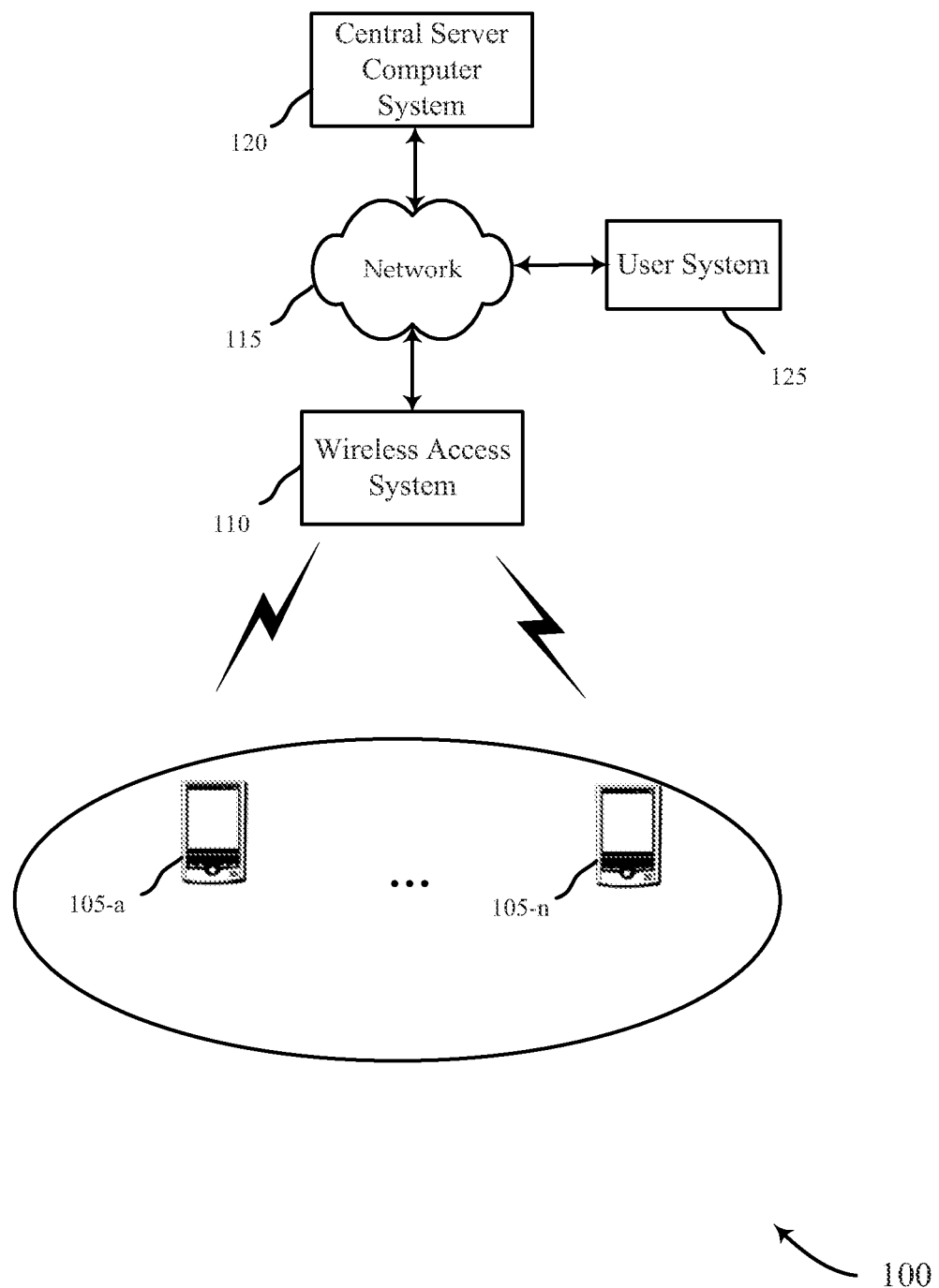
FIG. 1 shows a block diagram of an exemplary communications system.

Referring first to FIG. 1, a block diagram illustrates a system 100 according to one embodiment that includes user access terminals 105. A user access terminal 105 may be one of a number of devices, such as a smartphone, a cellular phone, a VoIP phone, a personal digital assistant, a tablet computer, a laptop computer, a portable digital music player, or other mobile device that communicates voice or data, or any combination of the foregoing. A user access terminal 105 may also include a network connected computer system, or gaming console, that includes a wired or wireless connection to a local area network, for example. It will be readily understood that a user access terminal may include any suitable device capable of operating to perform the functions for control user access to electronic applications, and the particular components illustrated in FIG. 1 are for purposes of illustration and discussion of general concepts described herein. In various embodiments, the user access terminals 105 are capable of obtaining biometric information from the user of the device. Such biometric information may be obtained, for example, from an imaging module that obtains an image of the user's face, imaging module that obtains an image of the user's fingerprint, and/or a microphone module that obtains a sample of the user's voice.

The user access terminals 105, in the embodiment of FIG. 1, connect to a wireless access system 110 through a wireless network. Such a wireless network may include any suitable wireless network capable of transmitting data on any of a number of different wireless protocols. Such networks are well known and need not be described in further detail here. The wireless access system 110 is interconnected to a network 115 such as, for example, the Internet, which has other network attached components. A central server computer system 120 is connected to the network 115 and, in various embodiments, performs functions related to control of user access to electronic applications. The central server computer system 120 may, for example, be made up one or more server computers, personal computers, workstations, web servers, or other suitable computing devices, and the individual computing device(s) for a given server may be local or remote from each other. In various embodiments, the central server computer system 120 receives and user biometric data along with user requests (initiated at user access terminals 105) to initiate an electronic application, verifies a sufficient quantity of virtual credits are present to initiate the electronic application, compares the received biometric data with previously stored biometric data for the user to verify the identity of the user, and provides or locks access to the electronic application based on the verification and comparison. In some embodiments, the verification of virtual credits and comparison of biometric data are repeated during application use. The central server computer system 120 may also receive data identifying a usage rate or amount for dispensing virtual credits for electronic application usage to a user as set by, for example, the user's parent or other authority. The usage rate or amount may be a rate of virtual credit adjustment based on a time period (such as one credit per hour, for example), or an amount of virtual credits needed to initiate an application (such as 2 credits, for example). The usage rate may include a base rate, and an adjustment to the base rate that is made according to various criteria, as will be described in more detail below.

A user system 125 is also connected to the network 115. Such a user system 125 may be another point of user access to electronic applications (such as a gaming console), or may be used by an authority to define the parameters of user access to electronic applications such as by providing data identifying a rate or amount for dispensing virtual credits for electronic application usage to a user. Of course, such an authority may also access and set parameters using other devices, such as a wireless device, for example. In some embodiments, the central server computer system 120 is configured to receive electronic application access requests from a user access terminal 105. There are a number of ways in the central server computer system 120 may determine to grant or deny access to such an electronic application, various examples of which will be described in more detail below.

Figure 2:
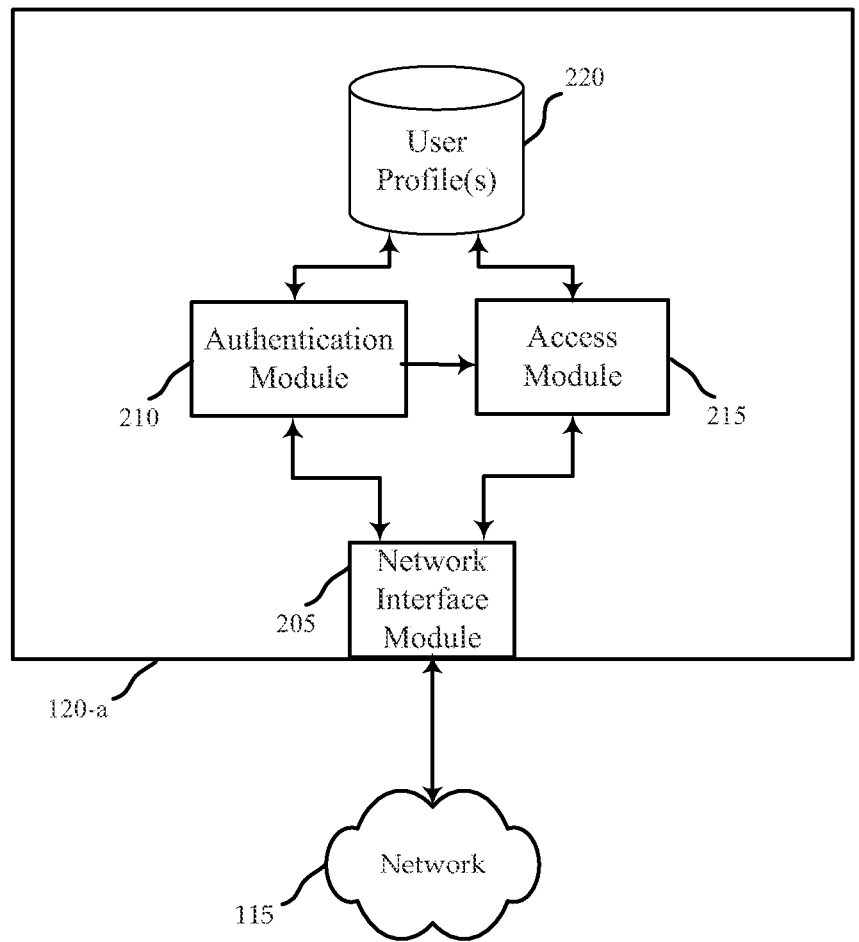
FIG. 2 shows a block diagram of an exemplary central server computer system.

With reference now to FIG. 2, an example of a central server computer system 120-*a* is described. A network interface module 205 provides an interconnection between components of the central server computer system 120-*a* and the network 115. An authentication module 210, an access module 215, and a user profile database 220 are interconnected in the central server computer system 120-*a* of this embodiment. When a request to access an electronic application is received at the central server computer system 120, the request is passed to the authentication module 210, which performs functions to verify the identify of the user requesting access. The access module 215 performs functions to verify a sufficient quantity of virtual credits are present to initiate the electronic application. In some embodiments, the access module 215 identifies two or more levels of electronic application access authority, each level of access authority having a rate or amount for dispensing virtual credits for electronic application usage to a user, verifies a sufficient amount of virtual credits are present to initiate the electronic application according to the identified authority and virtual credits available to the user The user profile database 220 includes information storage that may be retrieved, modified, and/or stored by the authentication module 210 and the access module 215, including data identifying a rate or amount for dispensing virtual credits for electronic application usage to a user, stored biometric data for user for use in verification of the identity of the user, and data identifying two or more levels of electronic application access authority, each level of access authority having a rate or amount for dispensing virtual credits for electronic application usage to a user. Data identifying levels of access authority may comprise date identifying a first level of access authority and a second level of access authority, the first level of access authority having authority to define the level of access that may be granted by the second level of access authority. For example, the first level of access authority may correspond to a parental access authority, with the second level of access authority corresponding to a caregiver access authority. The user profile database 220 may also include data identifying the electronic application as accretive or reductive of virtual credits and a rate or amount of accrual or reduction associated with the electronic application.

Figure 3:
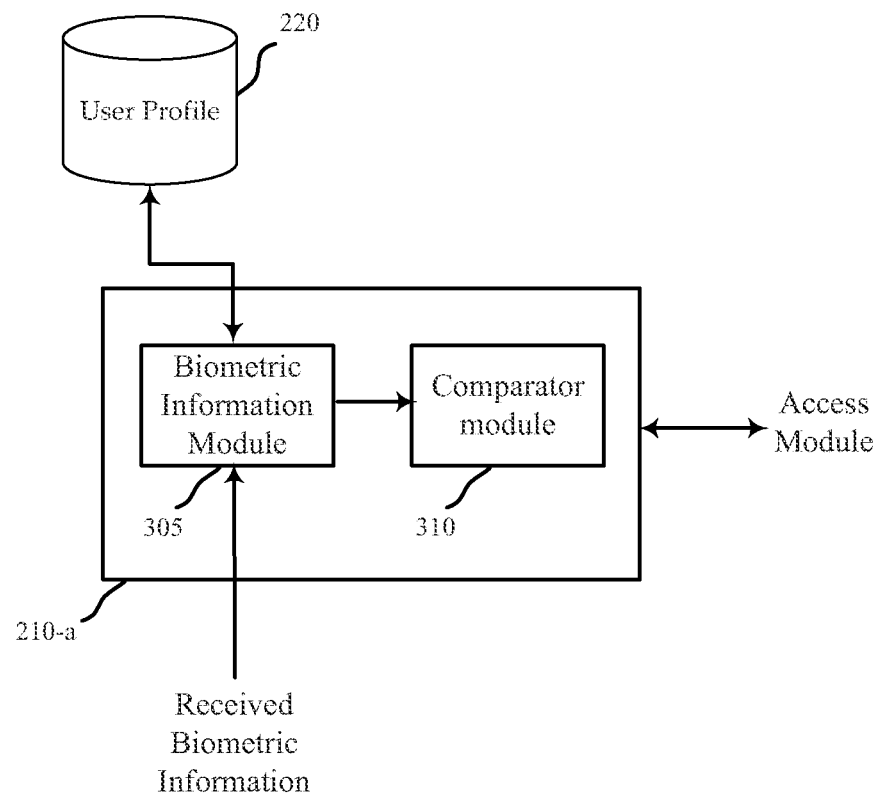
FIG. 3 shows a block diagram of an example of an authentication module.

FIG. 3 is an example of an authentication module 210-*a* according to an embodiment. In FIG. 3, the authentication module 210-*a* includes a biometric information module that is interconnected to the user profile database 220, and a comparator module 310. In this embodiment, a user access terminal collects biometric information from the user when access to an electronic application is requested. This biometric information may include, for example, one or more of an image of the user's face, an image of the user's fingerprint, and a sample of the user's voice. The user access terminal provides this biometric information to the authentication module 210-*a* through the network interface module and network (FIG. 2). The biometric information is received at the biometric information module 305. The biometric information module 305 obtains relevant stored biometric information associated with the user from the user profile database 220. The received biometric information and the stored biometric information are provided to the comparator module 310, where a comparison is made between the received biometric information and the stored biometric information. The comparator module 310 may use one or more of many available algorithms for comparison of biometric information, such as facial recognition algorithms, fingerprint comparison algorithms, and voice recognition algorithms, to name a few. The comparator module 310, in some embodiments, may network connected to a separate biometric comparison server. The output of the comparator module 310 is provided to the access module 215.

Figure 4:
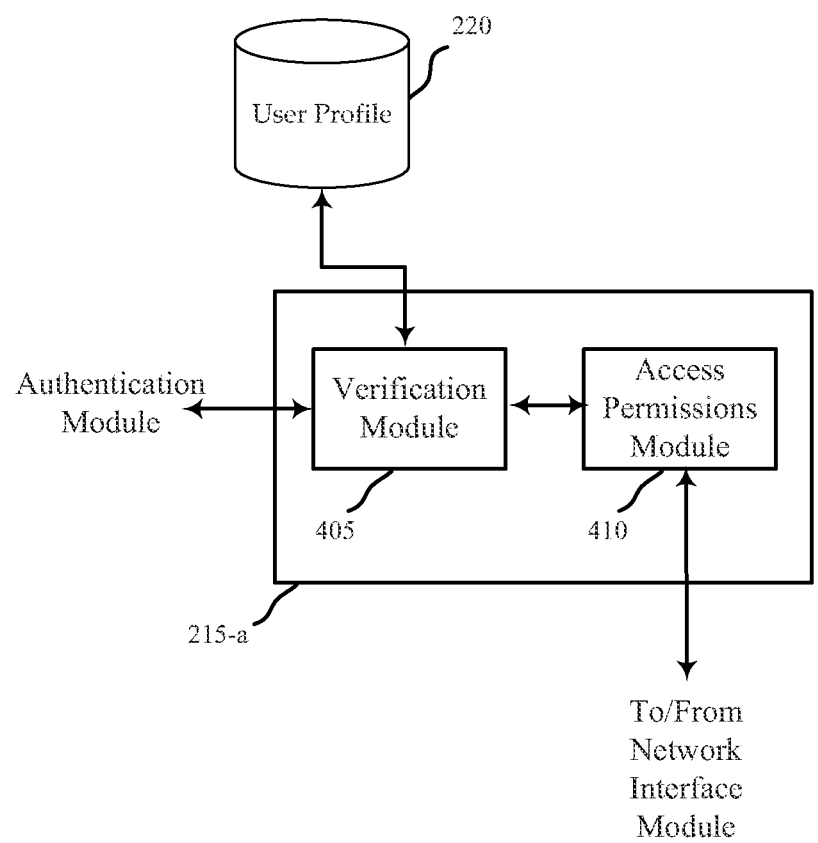
FIG. 4 shows a block diagram of an example of an access module.

With reference now to FIG. 4, an exemplary access module 215-*a* is described. The access module 215-*a* receives the biometric comparison information from the authentication module 210. The biometric comparison information may include an affirmative or negative result from the comparison of biometric information. The biometric comparison information in the example of FIG. 4 is received at a verification module 405. The verification module 405 is also interconnected to the user profile database 220, which in some embodiments includes information related to the user's current permissions to access electronic applications. This information can include, for example, an amount of virtual credits or points that represent an amount of time that the user may spend accessing an electronic application. The permissions information may also include information related to specific electronic applications that the user desires to access. Some electronic applications may have a higher rate of credit usage than other applications, and it is contemplated that the user may accrue credits through some electronic applications. The verification module 405 may also receive data comprising a base rate or amount for dispensing virtual credits and an adjustment to the base rate or amount to be applied based on predetermined conditions. For example, the permissions information may also include day and time restrictions on access to electronic applications, restrictions on locations where the user may access electronic applications, and multiple authority levels that may be present for a particular user. The access permissions module 410 interacts with the verification module 405 to determine if the user's biometric information is verified, whether the user has sufficient credits to access the requested electronic application, and the presence of any other restrictions on access. When all of these items are verified, the access permissions module 410 transmits an authorization command to the user through the network interface module, thereby providing the user access to the electronic application when the user has a sufficient quantity of virtual credits and the user identity is verified. If one or more of these items is not verified, the access permissions module 410 transmits an access denial to the user through the network interface module thereby locking the user from access to the electronic application when the virtual credits fall below a threshold level or the user identity is not verified. The verification module 405 may also initiate repeated authentication and verification of a sufficient quantity of virtual credits when the user is provided access to the electronic application. Such repeated authentication and verification may be performed at set periodic time intervals, or at random intervals. In some embodiments, the verification module provides information to the user access terminal related to the times for initiating repeated authentication and verification.

Figure 5:
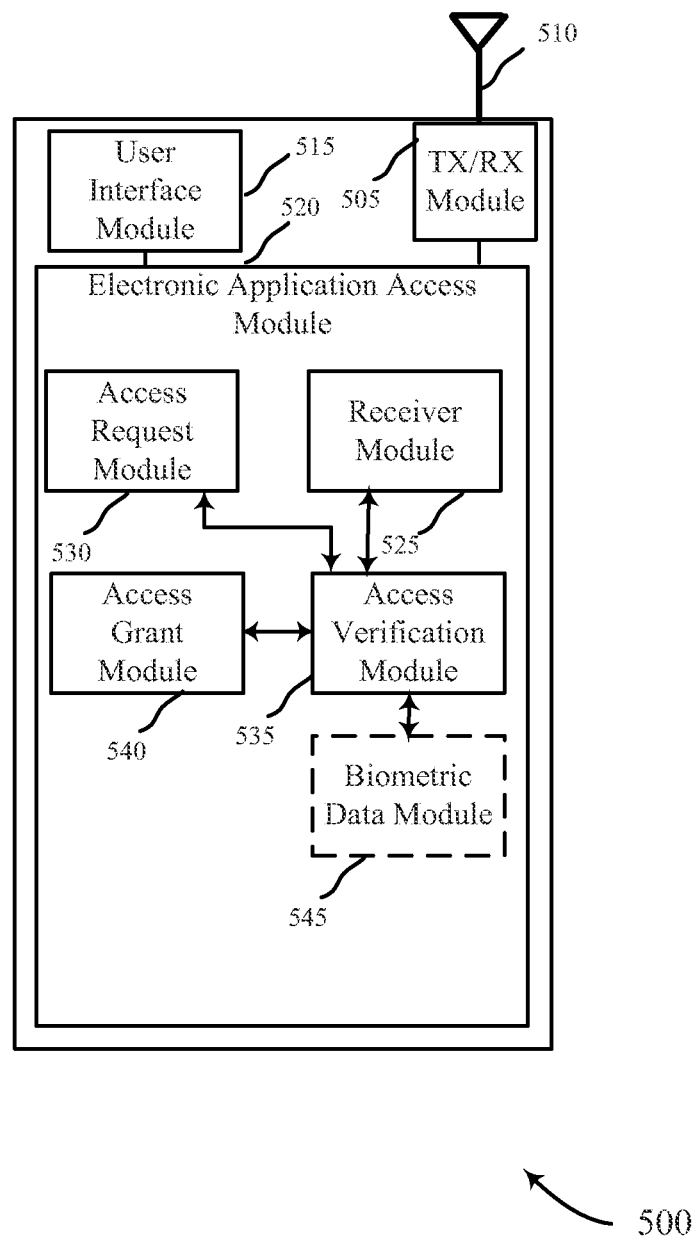
FIG. 5 shows a block diagram of an exemplary wireless device.

With reference now to FIG. 5, an example of a wireless device 500 that may operate as a user access terminal is described. The wireless device 500, as is standard in such devices, includes a wireless transceiver module 505, and associated hardware and software that perform wireless network access for the device 500. Such components are common on wireless devices and are well known to those of skill in the art. The transceiver module 505 transmits and receives RF signals through one or more antennas 510. A user interface module 515 includes hardware and software for user interaction with the device, including audio, visual, and keyboard components as may be present on the particular device. The user interface, in some embodiments, also includes an image capture device that functions to obtain images of the user, such as a facial image or an image of the user's fingerprint. The wireless device 500 of FIG. 5 also includes an electronic application access module 520. The electronic application access module 520 acts as a gatekeeper between the user and one or more electronic applications that the user may desire to access. The electronic application access module includes a receiver module 525, an access request module 530, an access verification module 535, and an access grant module. The electronic application access module 520 may optionally include a biometric data module 545.

The electronic application access module 520, transceiver module 505, and user interface module 515 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with software code instructions embodied in a memory, formatted to be executed directly or indirectly (e.g., after compiling) by one or more general or application-specific processors (or in combination with the processor(s)). Each unit may include memory, or accessed memory may be located elsewhere and accessed through the wireless network.

The receiver module 525 of this example receives the access request from the user. The receiver module 525 may include software that runs on the wireless device that is accessed when the user desired to initiate an electronic application. The receiver module 525 is interconnected to the access verification module 535 which verifies permissions for access to the electronic application. In some cases, the access verification module 535 may be programmed to allow or deny access to electronic applications based on time, day, and daily usage time limits, for example. The access verification module 535 may also be programmed to obtain permission from a remote system, such as the central server computer system as described above. In such a case, the electronic application access module 520 of FIG. 5 initiates an access request through access request module 530. The access request module 530 may collect information needed to request access to the selected electronic application, such as, for example, user information, selected electronic application information, location information (from, e.g., a positioning system included in the wireless device), and biometric information from the user. The requisite information is collected and forwarded, through the transceiver module 505, to the remote system and an authorization or denial is received back from the remote system. This information is provided to the access verification module 535. The access grant module 540 is configured to perform access grant functions, such as allowing the selected electronic application to launch, and initiating timers associated with allowed durations of access or related to a period after which re-verification is required, for example. The optional biometric data module 545, as mentioned above, may collect biometric information that is used in the access verification process.

Figure 6:
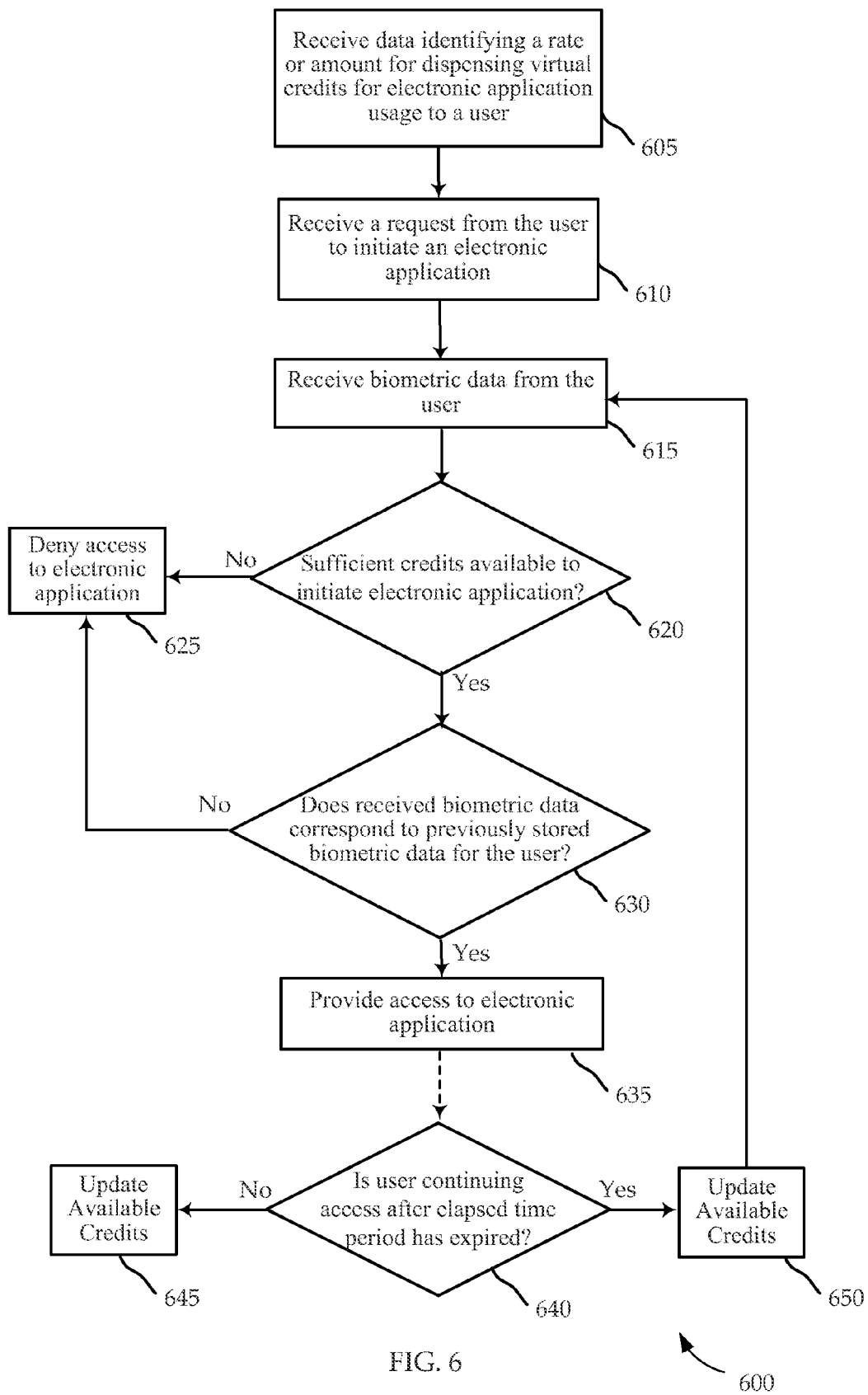
FIG. 6 is a flowchart of a method for control of electronic applications.

FIG. 6 is a flowchart illustrating a method 600 for accessing electronic applications according to various embodiments. The method 600 may be performed, for example, in whole or in part, by the central server computer system 120 described with reference to FIGS. 1-4. One or more steps may be performed by a user access terminal 105 or wireless device 500 described with reference to FIGS. 1 and 5, respectively. Initially, at block 605, data is received identifying a rate or amount for dispensing virtual credits for electronic application usage to a user. The data may identify, for example, a particular electronic application and a rate of virtual credits applicable to the application. For example, a particular electronic application may be assigned a rate requiring one virtual credit per fifteen minutes of application usage. Alternatively, a particular electronic application may be assigned a rate in which one virtual credit is accrued per fifteen minutes of application usage. The rate of usage or accrual may be based on particular application characteristics, such as educational applications versus social networking or video game applications. At block 610, a request is received from the user to initiate an electronic application. At block 615, biometric data from the user is received. As mentioned above, biometric data may include any physical and/or behavioral data that uniquely identifies the user, such as facial image data, fingerprint data, and/or voice data, to name a few. One or more of these characteristics may be received at block 615. A determination is made at block 620 whether sufficient credits are available to the user to initiate the electronic application. If the user does not have sufficient credits, access is denied according to block 625. If sufficient credits are available to the user, block 630 determined if the received biometric data correspond to previously stored data for the user. If the biometric data do not correspond, access to the electronic application is denied at block 625. If the biometric data is determined to correspond to the previously stored data, it is determined that the identity of the user is likely verified, and access to the electronic application is granted, as noted at block 635. User identity verification may be useful to prevent a user having sufficient credits from allowing a friend or other user to use their credits. User identity verification also may be useful to track the amount of time that a particular user actually spends using electronic applications.

In the optional blocks 640-650 in the example of FIG. 6, user identity and availability of sufficient credits may be re-verified during use of the electronic application. At block 640, it is determined if the user is continuing access to the electronic application after an elapsed time period has expired. The time period of block 640 may be a periodic time period, such as every five minutes, or may be a randomly variable time period, such as some time between two and five minutes. If the user is no longer accessing the electronic application, the available credits are updated at block 645. If the user is continuing use of the application after the time period, credits available to the user are updated at block 650, and the method proceeds to block 615 to perform re-verification of sufficient available credits and re-authentication of biometric information. Such re-verification and re-authorization may prevent over-use of the electronic application beyond the virtual credits a user has available, and may help to prevent a user from allowing an unauthorized user to access the electronic application.

Figure 7:
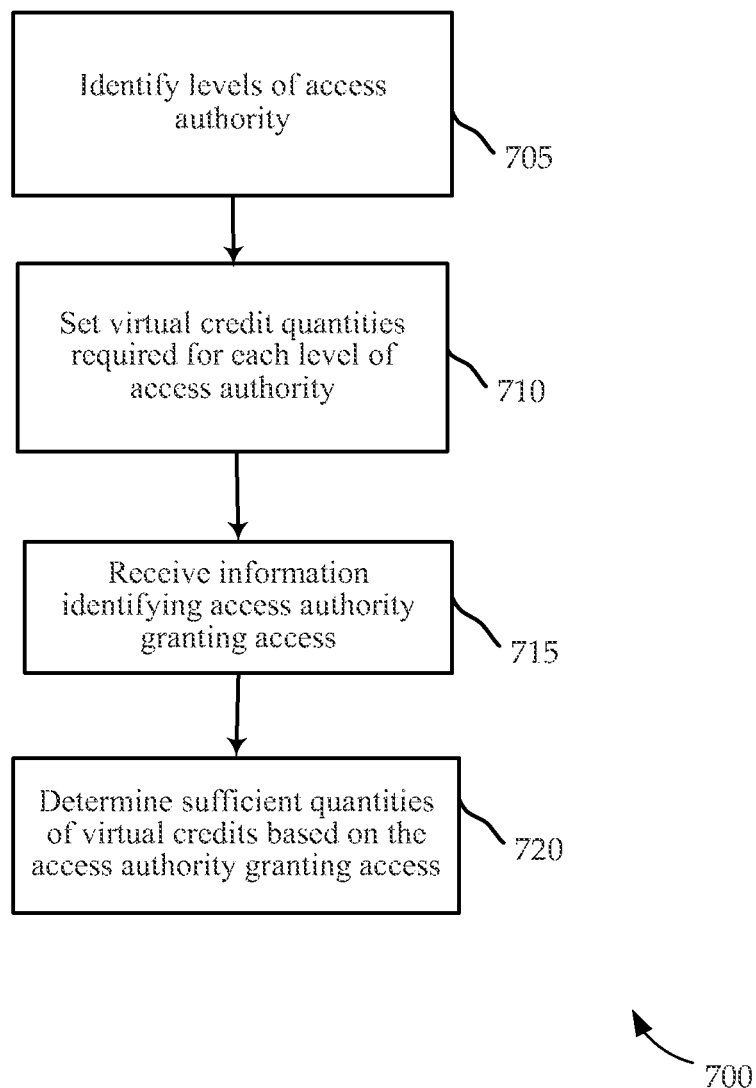
FIG. 7 is a flowchart of a method for setting levels of access authority for use in control of electronic applications.

With reference now to FIG. 7, a method 700 including multiple access authorities of an embodiment is described. In this embodiment, different levels of access authority are identified, as noted at block 705. Different levels of access authority may include a parental access authority, having the highest levels of authority to grant or deny permission to use electronic applications, and one or more lesser levels of access authority. At block 710, virtual credit quantities required for electronic application access are set for each level of access authority. For example, a parent may employ the services of a caregiver, such as a nanny, for some portion of the day or week. One or more children may be the users that desire access to electronic applications. The parent may desire to allow a child access to a limited subset of electronic applications and/or allow access for a limited time period while the caregiver is responsible for the child. In such a case, a maximum number of allowed credits may be set for use during the noted time period. Similarly, a parent may restrict electronic application access during time periods during which the child is known to be in school or doing schoolwork. In such a case, the parent may set strict restrictions on access to electronic applications, regardless of the number of credits available to the child. Access levels and permissions may also be delegated according to some embodiments. For example, a parent may delegate access levels and permissions to a school teacher, who may then set permissions related to access of electronic applications.

At block 715, information identifying the access authority granting access to electronic applications is received. This information may be received in the form of a default schedule for the particular user, for example identifying school hours with access authority given to a school official. At block 720, it is determined if sufficient quantities of virtual credits are available based on the access authority that is granting access to an electronic application. In one embodiment, an access authority is provided a rate at which virtual credits are consumed or accrued for access to particular electronic applications. In such a case, a rate may be set at a very high number, allowing the user to access an application, but consuming virtual credits at a relatively fast rate. If it is desired to restrict the user completely from access during some time periods, the rate may be set high enough that the user would not be deemed to have sufficient credits to access the electronic application for even the minimum time period. Similarly, if it is desired to encourage the user to engage in certain electronic applications, such as educational applications to encourage spelling or vocabulary, for example, an accrual rate may be adjusted. by way for example, a parent may have a child care provider watch a child for some time after school each school day, during which time the parent would prefer the child engage in educational activities. The caregiver may be given access authority that reflects an incentive for such educational applications, while giving the child some freedom to make their own decisions and also allowing the caregiver authority to restrict permissions as needed.

Figure 8:
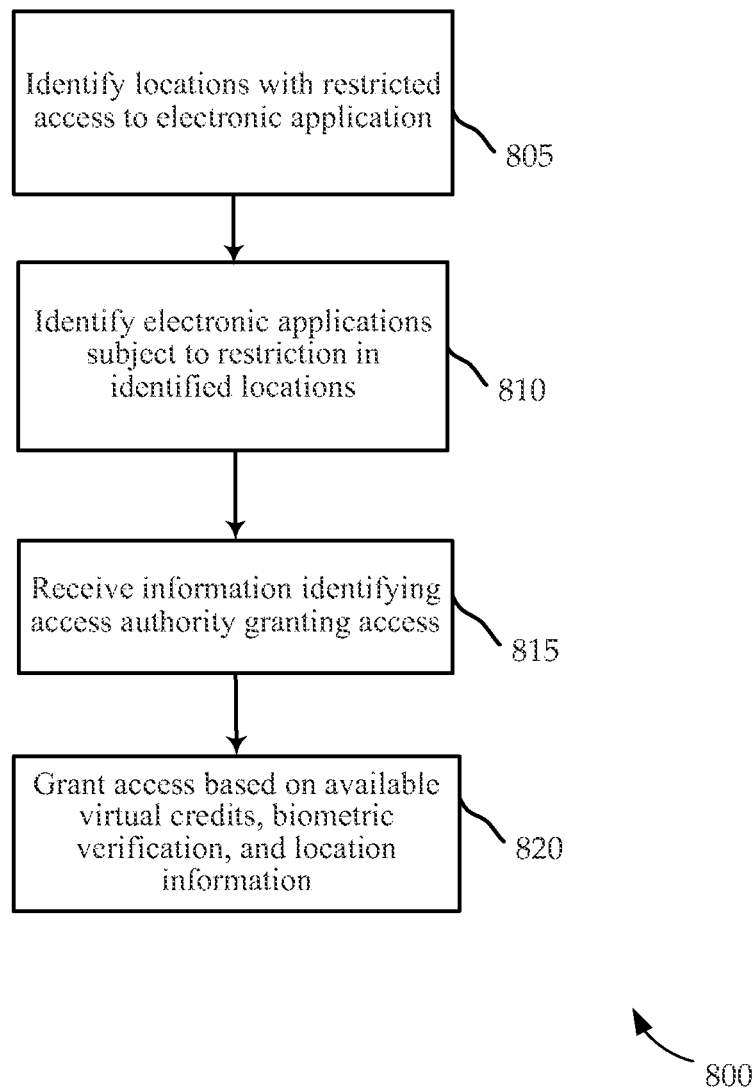
FIG. 8 is a flowchart of a method for setting location restrictions for use in control of electronic applications.

Referring now to FIG. 8, a method 800 is described for restricting electronic application access based on location, according to some embodiments. Initially, at block 805, locations are identified which have restricted access to electronic applications. Such locations may include, for example, a school or a library, where the user may restricted from accessing certain electronic applications. At block 810, the electronic applications subject to the restriction are identified for the identified locations. For example, a user may be restricted to only educational applications when at a library. The restrictions may also be based on the level of access authority that applies at a certain time, with information identifying the access authority granting access to the electronic application received, as noted at block 815. For instance, a child may visit a friend's house, where it is desired to restrict access to certain electronic applications unless allowed, for example, by the friend's parent, who may be designated as having access authority for that particular location. At block 820, access to the electronic applications is granted based on available virtual credits, biometric verification, and location information. As mentioned above, location information may be obtained from, for example, a positioning system integrated into the user's access terminal.

Figure 9:
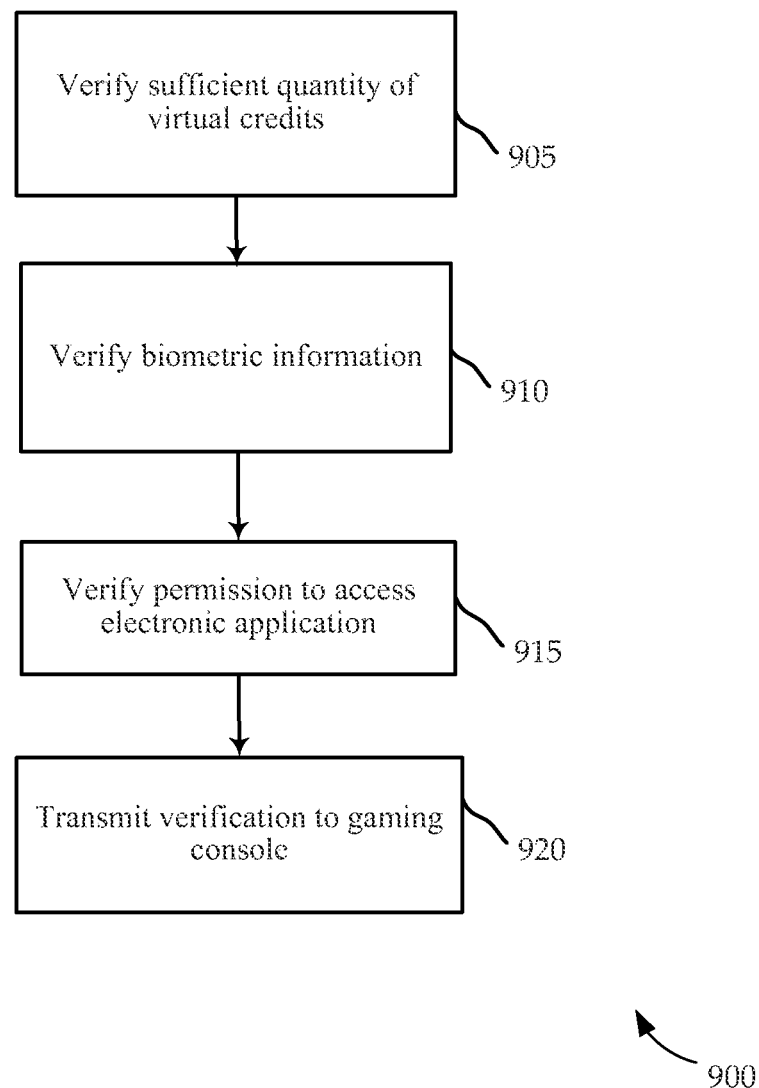
FIG. 9 is a flowchart of a method for communicating an authorization to access an electronic application to a gaming console.

In some embodiments, permission to access an electronic application is transmitted to a device that is remote from the user access terminal. FIG. 9 illustrates an exemplary method 900 for such remote authorization to a gaming console. At block 905, a sufficient quantity of virtual credits is verified. At block 910, biometric information is verified. The verification of credits and biometric information may be accomplished as described above, for example. At block 915, it is verified that permission to access the electronic application is available. Such permission may be according to the level of access authority and/or location information, similarly as described above. At block 920, a verification is transmitted to the gaming console, thereby allowing the user to access the game on the gaming console. For example, a user may wish to use a gaming console for a particular video game. Assuming the user has permission and credits to access the application, the user terminal verifies the requisite information and transmits the authorization to the gaming console. In one embodiment, the user access terminal and gaming console are both connected to a wireless local area network, and authorization is transmitted from the user terminal to gaming console through the wireless LAN. In other embodiments, both the user access terminal and gaming console are Internet connected, with authorization transmitted through an Internet connection.

Other embodiments may include a separate module that is connected to the gaming console, such as between a controller or power input, that interrupts a needed connection until authorization is received.

Figure 10:
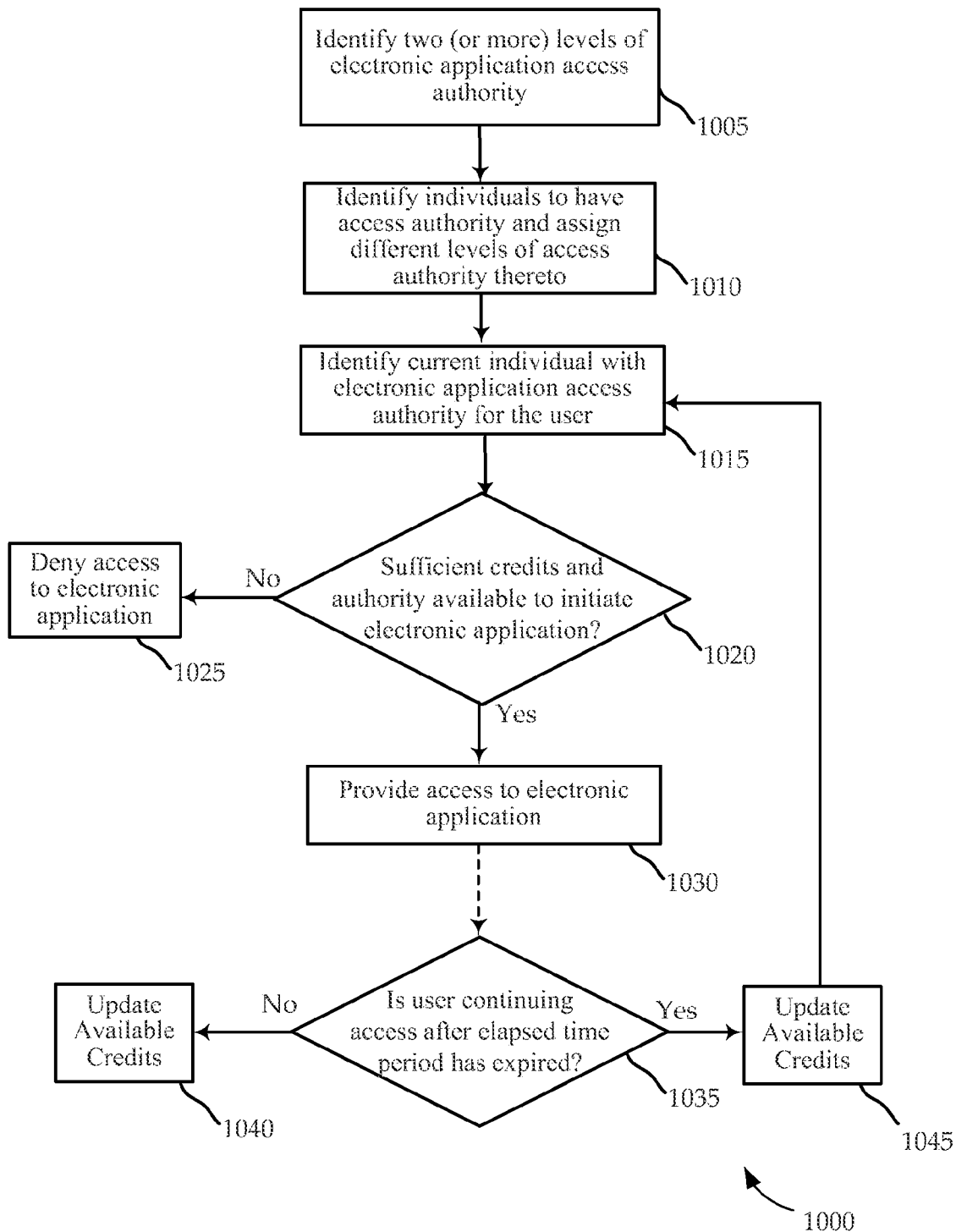
FIG. 10 is a flowchart of a method for control of electronic applications with multiple levels of access authority.

With reference now to FIG. 10, another exemplary method 1000 for providing user access to electronic applications is described. In this embodiment, two (or more) levels of electronic application access authority are identified, as noted at block 1005. At block 1010, the method identifies individuals to have access authority and assigns different levels of access authority to the identified individuals. For example, an after-school child care provider may be granted a first level of access authority, and a school official may be granted a second level of access authority. At block 1015, the current individual with electronic application access authority is identified. Such identification may be by way of a preset schedule, may be based on location information of the user, and/or may be based on manual identification of the particular individual. At block 1020 it is determined if sufficient credits and authority are available to initiate access to an electronic application. If the available credits, and/or access authority are not sufficient to initiate access, access to the electronic application is denied, as indicated at block 1025. If the available credits, and access authority, are sufficient to initiate access, access to the electronic application is granted, as indicated at block 1030. In some embodiments, the method of FIG. 10 may perform re-verification periodically, according to blocks 1035-1045. Such re-verification may include determining, at block 1035, whether the user is continuing access after an elapsed time has expired. If the user is no longer accessing the electronic application, the credits available to the user are updated, as indicated at block 1040. If the user is continuing access to the electronic application, the available credits are updates at block 1045, and the operations of block 1015 are initiated.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of control of electronic applications, the method comprising:
   receiving, at a central server computer, data identifying two or more authorities having different levels of access authority for granting a first user access to an electronic application, the two or more authorities belonging to persons other than the first user, and each of the different levels of access authority having a different usage rate or amount for dispensing virtual credits for electronic application usage to the first user;

receiving, at the central server computer, a request from the first user to initiate an electronic application;

identifying, at the central server computer, one of the authorities as having current electronic application access authority for the first user;

verifying, by the central server computer, a sufficient quantity of virtual credits are present to initiate the electronic application according to the identified access authority and virtual credits available to the first user;

receiving, at the central server computer, biometric data from the first user;

comparing, by the central server computer, the received biometric data with previously stored biometric data for the first user to verify the identity of the first user;

providing, by the central server computer, the first user access to the electronic application when the first user has a sufficient quantity of virtual credits and the first user identity is verified; and locking, by the central server computer, the first user from access to the electronic application when the virtual credits are below a threshold level or the first user identity is not verified.

2. The method of claim 1, wherein the different levels of access authority of the two or more identified authorities comprise a first level of access authority and a second level of access authority, the first level of access authority having authority to define a level of access that may be granted by the second level of access authority to the first user.

3. The method of claim 2, wherein the first level of access authority corresponds to a parental authority, and the second level of access authority corresponds to a caregiver authority.

4. The method of claim 1, wherein the receiving data comprises receiving data identifying the electronic application as accretive or reductive of virtual credits and a rate or amount of accrual or reduction associated with the electronic application.

5. The method of claim 4, further comprising:
adjusting the quantity of virtual credits available to the first user based on (i) the amount of time during which the first user accesses the electronic application, and (ii) the rate or amount of accrual or reduction associated with the electronic application.

6. The method of claim 1, further comprising:
adjusting the quantity of virtual credits available to the first user based on the amount of time during which the first user accesses the electronic application and transmitting to a remote system an amount of the adjustment of virtual credits.

7. The method of claim 1, wherein the receiving biometric data comprises receiving biometric information from a mobile device associated with the first user.

8. The method of claim 1, further comprising:
transmitting an electronic application access verification to a remote system in proximity to the first user.

9. The method of claim 8, wherein the remote system is a gaming console.

10. The method of claim 1, wherein the receiving data comprises receiving a base rate or amount for dispensing virtual credits and an adjustment to the base rate or amount to be applied based on predetermined conditions.

11. The method of claim 10, wherein the adjustment to the base rate or amount is set according to parental specifications.

12. The method of claim 10, wherein the adjustment to the base rate or amount varies as a function of one or more of (i) time of day and (ii) day of the week.

13. The method of claim 1, wherein the receiving biometric data comprises receiving one or more of an image of the first user's face, a first user voice sample, and an image of the first user's fingerprint.

14. The method of claim 1, further comprising repeating the receiving of biometric data and comparing steps at fixed periodic time intervals.

15. The method of claim 1, further comprising repeating the receiving of biometric data and comparing steps at variable time intervals.

16. A system for providing user access to an electronic application, comprising:
one or more hardware processors;
a non-transitory computer-readable medium comprising instructions, when executed by the one or more hardware processors, causes the one or more hardware processors to perform a method, the method comprising:
receiving data identifying two or more authorities having different levels of access authority for granting a first user access to an electronic application, the two or more authorities belonging to persons other than the first user, and each of the different levels of access authority having a different usage rate or amount for dispensing virtual credits for electronic application usage to the first user;
receiving a request from the first user to initiate an electronic application;
identifying one of the authorities as having current electronic application access authority for the first user;
verifying a sufficient quantity of virtual credits are present to initiate the electronic application according to the identified access authority and virtual credits available to the first user;
receiving biometric data from the first user;
comparing the received biometric data with previously stored biometric data for the first user to verify the identity of the first user;
providing the first user access to the electronic application when the first user has a sufficient quantity of virtual credits and the first user identity is verified; and
locking the first user from access to the electronic application when the virtual credits are below a threshold level or the first user identity is not verified.

17. The system of claim 16, further comprising:
the one or more hardware processors adjusting the quantity of virtual credits available to the first user based on the amount of time during which the first user accesses the electronic application.

18. The system of claim 16, wherein receiving data comprises:
receiving data identifying the electronic application as accretive or reductive of virtual credits and a rate or amount of accrual or reduction associated with the electronic application.

19. The system of claim 18, further comprising:
the one or more hardware processors adjusting the quantity of virtual credits available to the first user based on (i) the amount of time during which the first user accesses the electronic application, and (ii) the rate or amount of accrual or reduction associated with the electronic application.

20. The system of claim 16, wherein the receiving data comprises receiving a base rate or amount for dispensing virtual credits and an adjustment to the base rate or amount to be applied based on predetermined conditions.

21. The system of claim 16, wherein the receiving biometric data comprises receiving one or more of an image of the first user's face, a first user voice sample, and an image of the first user's fingerprint.

22. The system of claim 16, further comprising the one or more hardware processors repeating receiving biometric data according to fixed periodic time intervals.

23. An apparatus for providing user access to an electronic application, comprising:
   a network interface module configured to:
      receive a request for access to an electronic application by a first user; and
      receive biometric information associated with the first user;
   a user profile database comprising:
      first user biometric information;
      first user virtual credit information; and
      identities of two or more authorities each having a different level of access authority for granting the first user access to an electronic application, the two or more authorities belonging to persons other than the first user, and each of the different levels of access authority having a different usage rate or amount for dispensing virtual credits for electronic application usage to the first user;
   an authentication module configured to receive the access request and biometric information, communicatively coupled with the network interface and user profile database, and configured to verify the received biometric information corresponds to first user biometric information from the user profile database; and
   an access module communicatively coupled with the network interface, the authentication module, and user profile database, the access module comprising a hardware processor configured to (i) receive the access request, (ii) identify an access authority as having current electronic application access authority for the first user, (iii) determine a level of access authority that applies to the access request based on the identified access authority, (iv) verify a sufficient quantity of virtual credits are present for the first user in the user profile database to initiate the electronic application based on the identified access authority and virtual credits available to the first user, (v) receive a comparison of biometric data from the authentication module, and (vi) provide or deny the first user access to the electronic application according to the verification and comparison.

24. The apparatus of claim 23, wherein the different levels of access authority of the two or more identified authorities comprise a first level of access authority and a second level of access authority, the first level of access authority having authority to define a level of access that may be granted by the second level of access authority to the first user.

25. The apparatus of claim 23, wherein the access module is further configured to adjust the quantity of virtual credits available to the first user based on the amount of time during which the first user accesses the electronic application.

26. The apparatus of claim 23, wherein the user profile database further comprises information related to two or more electronic applications, data identifying each electronic application as accretive or reductive of virtual credits, and a rate or amount of accrual or reduction associated with the electronic application, and
   wherein the access module is further configured to adjust the quantity of virtual credits available to the first user based on the amount of time during which the first user accesses the particular electronic application and the rate or amount of accrual or reduction associated with the electronic application.

27. The apparatus of claim 23, wherein the biometric data comprises one or more of an image of the first user's face, a first user voice sample, and an image of the first user's fingerprint.

28. The apparatus of claim 23, wherein the access module is further configured to repeat, according to fixed periodic time intervals, authentication and
   verification of a sufficient quantity of virtual credits when the first user is provided access to the electronic application.

29. A mobile device for providing user access to an electronic application, comprising:
   a receiver module configured to receive data identifying two or more authorities having different levels of access authority for granting a first user access to an electronic application, the two or more authorities belonging to persons other than the first user, and each of the different levels of access authority having a different usage rate or amount for dispensing virtual credits for electronic application usage to the first user;
   an access request module configured to receive a request from the first user to initiate an electronic application, and to receive identification of an access authority granting access to the electronic application;
   an access verification module communicatively coupled to the access request module and receiver module, and comprising a hardware processor configured to (i) determine a level of access authority that applies to the access request, (ii) verify a sufficient quantity of virtual credits are present to initiate the electronic application based on the identified access authority and virtual credits available to the first user, and (iii) receive a comparison of biometric data to verify the identity of the first user; and
   an access grant module communicatively coupled to the access verification module and configured to provide or deny the first user access to the electronic application according to information from the access verification module.

30. The mobile device of claim 29, wherein the access verification module is further configured to repeat the verification and receipt of comparison of biometric data while the first user is provided access to the electronic application.

31. The mobile device of claim 29, further comprising:
   a biometric data module communicatively coupled to the access verification module and configured to receive biometric data associated with the first user and compare the received biometric data with previously stored biometric data for the first user to verify the identity of the first user.

32. The mobile device of claim 31, further comprising:
   a biometric information collection module communicatively coupled to the biometric data module and configured to acquire one or more of an image of the first user's face, an image of the first user's fingerprint, and a sample of the first user's voice.

33. A computer program product comprising:
   a non-transitory computer-readable medium comprising:
      code for receiving data identifying two or more authorities each having different levels of access authority for granting a first user access to an electronic application, the two or more authorities belonging to persons other than the first user, and each of the different levels of access authority having a different usage rate or amount for dispensing virtual credits for electronic application usage to the first user;

code for identifying one of the authorities as having current electronic application access authority for the first user;

code for receiving a request from the first user to initiate an electronic application;

code for verifying a sufficient quantity of virtual credits are present to initiate the electronic application according to the identified access authority and virtual credits available to the first user;

code for receiving biometric data from the first user;

code for comparing the received biometric data with previously stored biometric data for the first user to verify the identity of the first user;

code for providing the first user access to the electronic application when the first user has a sufficient quantity of virtual credits and the first user identity is verified; and code for locking the first user from access to the electronic application when the virtual credits are below a threshold level or the first user identity is not verified.

34. The computer program product of claim 33, further comprising:

code for adjusting the quantity of virtual credits available to the first user based on the amount of time during which the first user accesses the electronic application.

35. The computer program product of claim 33, wherein the code for receiving data comprises: code for receiving data identifying the electronic application as accretive or reductive of virtual credits and a rate or amount of accrual or reduction associated with the electronic application.

36. The computer program product of claim 33, further comprising:

code for adjusting the quantity of virtual credits available to the first user based on (i) the amount of time during which the first user accesses the electronic application, and (ii) the rate or amount of accrual or reduction associated with the electronic application.

37. The computer program product of claim 33, wherein the code for receiving data comprises code for receiving a base rate or amount for dispensing virtual credits and an adjustment to the base rate or amount to be applied based on predetermined conditions.

38. A method for administering user access to an electronic application, the method comprising:

identifying, at a central server computer, two or more authorities having different levels of access authority for granting access for electronic application usage to a first user, the two or more authorities belonging to persons other than the first user, and each of the two or more levels of access authority having a different usage rate or amount for dispensing virtual credits for electronic application usage to the first user;

identifying, by the central server computer, one of the authorities as having current electronic application access authority for the first user;

receiving, at the central server computer, a request from the first user to initiate an electronic application;

verifying, at the central server computer, a sufficient quantity of virtual credits are present to initiate the electronic application according to the identified authority and virtual credits available to the first user;

providing, by the central server computer, the first user access to the electronic application when the first user has sufficient quantity of virtual credits for the identified authority; and locking, by the central server computer, the first user from access to the electronic application when the virtual credits are below a threshold level.

39. The method of claim 38, wherein the different levels of access authority of the two or more identified authorities comprise a first level of access authority and a second level of access authority, the first level of access authority having authority to define the level of access that may be granted by the second level of access authority.

40. The method of claim 39, wherein the first level of access authority corresponds to a parental authority, and the second level of access authority corresponds to a caregiver authority.

41. The method of claim 40, wherein the first level of access authority has authority to set time periods during which the first user is locked from access to the electronic application regardless of the quantity of virtual credits available to the first user.

42. The method of claim 38, further comprising:

determining a current location of the first user; and locking the first user from access to the electronic application when the first user is within preset location boundaries.

43. The method of claim 42, wherein the preset location boundaries correspond to the location of a school.

* * * * *